May 20, 1958           E. H. LAND           2,835,176

CARRYING CASE FOR PHOTOGRAPHIC APPARATUS

Filed Sept. 29, 1955           5 Sheets-Sheet 1

INVENTOR.
Edwin H. Land
BY Brown and Mikulka
and
Robert E. Corb
ATTORNEYS

May 20, 1958   E. H. LAND   2,835,176
CARRYING CASE FOR PHOTOGRAPHIC APPARATUS
Filed Sept. 29, 1955   5 Sheets-Sheet 2

INVENTOR.
Edwin H. Land
BY Brown and Mikulka
and Robert E. Corb
ATTORNEYS

May 20, 1958 E. H. LAND 2,835,176
CARRYING CASE FOR PHOTOGRAPHIC APPARATUS
Filed Sept. 29, 1955 5 Sheets-Sheet 3
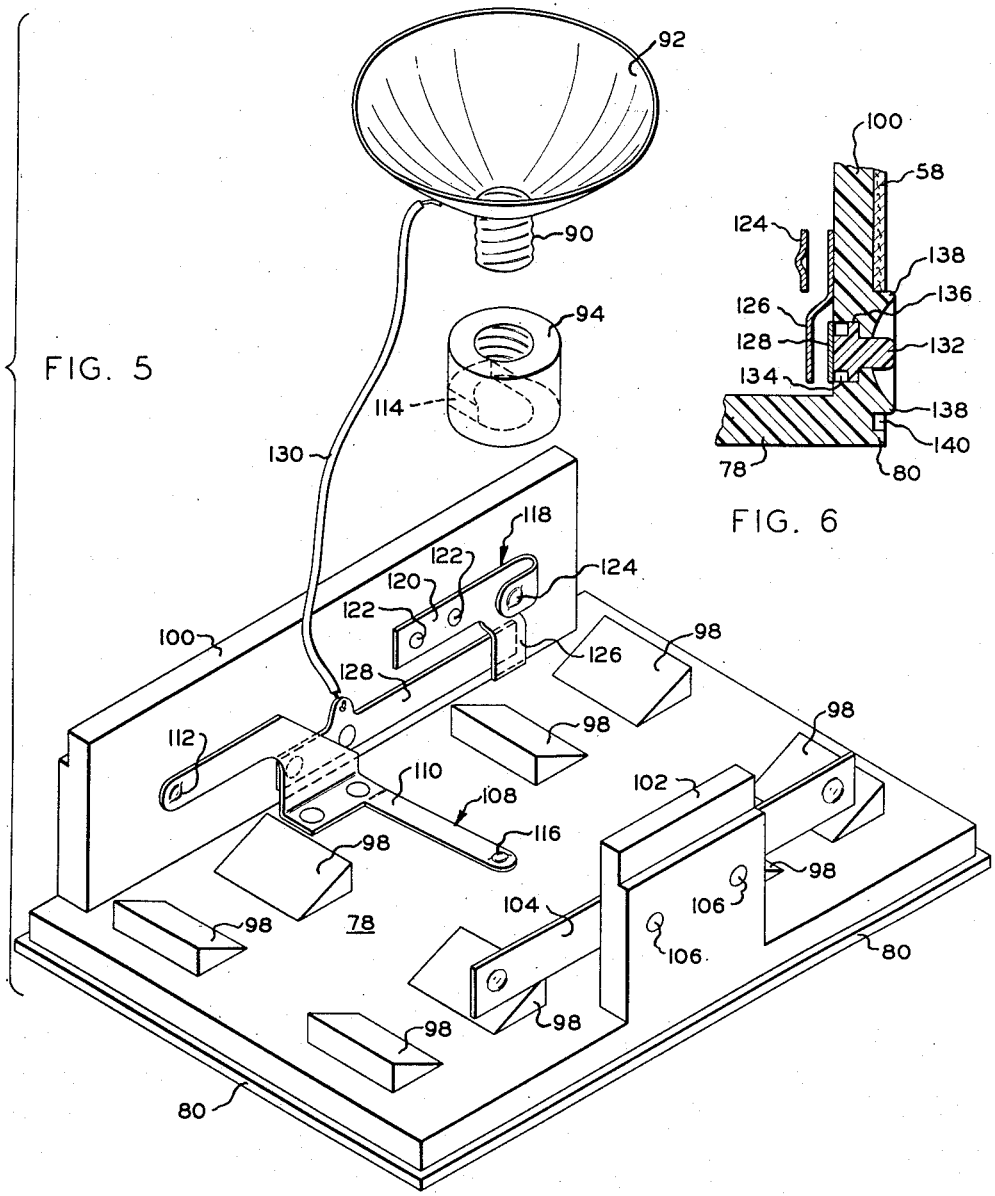

May 20, 1958      E. H. LAND      2,835,176

CARRYING CASE FOR PHOTOGRAPHIC APPARATUS

Filed Sept. 29, 1955      5 Sheets-Sheet 4

INVENTOR.
Edwin H. Land
BY Brouward Mikulka
and Robert E. Corb
ATTORNEYS

May 20, 1958  E. H. LAND  2,835,176
CARRYING CASE FOR PHOTOGRAPHIC APPARATUS
Filed Sept. 29, 1955  5 Sheets-Sheet 5

INVENTOR.
Edwin H. Land
BY Broward Mikulka
and
Robert E. Corb
ATTORNEYS

United States Patent Office 2,835,176
Patented May 20, 1958

2,835,176

CARRYING CASE FOR PHOTOGRAPHIC APPARATUS

Edwin H. Land, Cambridge, Mass., assignor to Polaroid Corporation, Cambridge, Mass., a corporation of Delaware Application September 29, 1955, Serial No. 537,423

7 Claims. (Cl. 95—12)

This invention relates to photographic apparatus and more particularly to a novel combination camera and viewer and carrying case therefor.

An object of the invention is to provide a novel carrying case for a camera of the type which produces a visible record directly, said case cooperating with said camera for exhibiting photographic records so produced.

Other objects of the invention are: to provide, in combination with a camera for producing visible records directly, a carrying case for said camera including a source of illumination and cooperating with said camera to render the latter useful as a viewer for visible photographic records produced therein; and to provide a carrying case of the above type which allows a camera to be employed for taking, processing and viewing visible photographic records.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is an exploded perspective view of one component of the carrying case of Figs. 3 and 4;

Fig. 6 is an enlarged cross-sectional view taken through a portion of the carrying case of Figs. 3 and 4;

Figure 2:
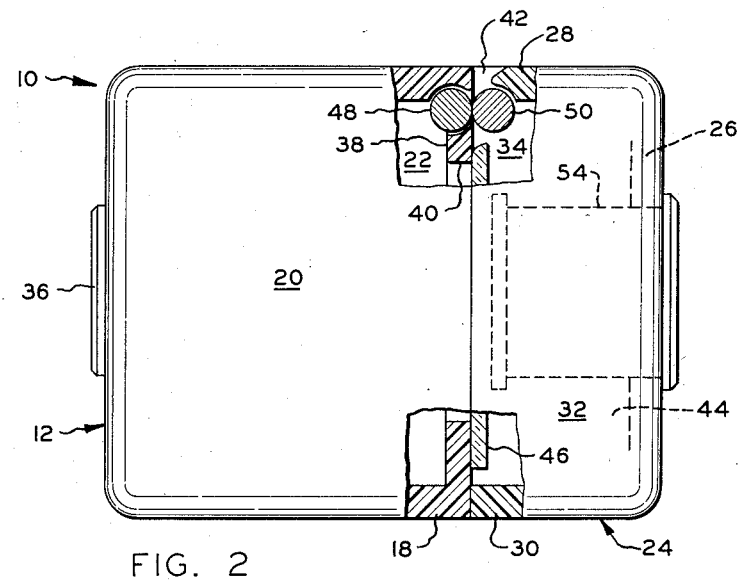
Fig. 2 is an elevation view, partially in section, of the camera of Fig. 1.
Figure 1:
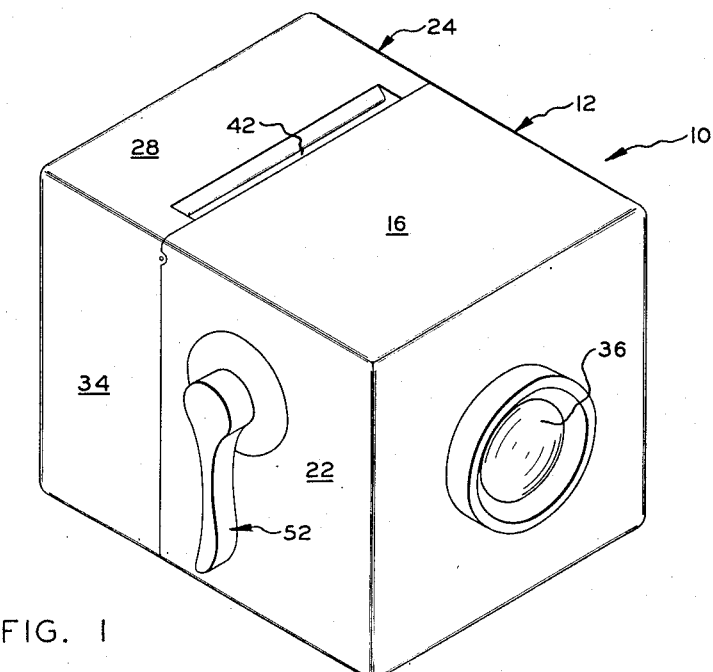
Figure 1 is a perspective view of a camera of the type adapted to use with the present invention.

Most conventional photographic processes and particularly color processes require considerable time, skill and equipment for processing the photosensitive element to form a visible image following exposure. The advantages to be derived from being able to view a photographic image, and particularly an image in color within a very short time after exposure, are numerous, especially when this can be accomplished with only the camera and its carrying case and requires no extra equipment.

Accordingly, the present invention contemplates the combination of a camera, and preferably a self-developing camera wherein a photosensitive element is exposed and processed to produce a visible photographic record, particularly a transparency adapted to be exhibited in color, and a novel carrying case for the camera which cooperates with the camera to form a viewer for photographic records produced in the camera. The camera is preferably of the type disclosed in my copending application, Serial No. 463,848, filed October 22, 1954, and is capable of exposing the photosensitive element of a film unit and of processing the film unit to produce a visible photographic print, for example a positive transparency, and is adapted, when coupled with a light source, for exhibiting transparencies produced therein. The carrying case of the invention not only provides convenient means for protectively enclosing and supporting this type of camera but is so constructed and coupled with the camera as to permit the camera to be employed for either exposing and processing photographic film units or for viewing photographic transparencies so produced. The carrying case includes batteries and a source of illumination and cooperates with the camera to form a convenient viewer which may be employed for examining each photographic print immediately following processing within the camera.

A preferred form of camera comprising the invention is designated at 10 in the drawings and is preferably small, being only sufficiently large to produce a transparency, for example of 35 mm. size. Camera 10 comprises a housing having two sections, a forward section 12 including an upper wall 16, bottom wall 18 and side walls 20 and 22 and a rear section 24 including a rear wall 26, an upper wall 28, bottom wall 30 and two side walls 32 and 34. A conventional lens and shutter assembly 36 is mounted on the forward portion of section 12, said section including a guide wall 38 located at the rear of the section and having a rear surface located substantially at the focal surface of the lens of assembly 36. Guide wall 38 is provided with a rectangular exposure aperture 40 through which a photosensitive element, positioned against the rear surface of wall 38, may be exposed to light transmitted by the lens of assembly 36.

The camera is adapted to use with a film unit of the type including a photosensitive element, a second or image-receptive element and means containing a processing liquid. The photosensitive element includes a layer of photosensitive material, preferably an emulsion of silver halide, in which a latent image may be obtained by differential exposure to actinic light, cast on a suitable support or backing. The second element is superposed with the photosensitive element and is formed of a transparent material adapted to serve as a support for an image-receptive layer in which a visible print of a latent image in the photosensitive layer may be produced. The film unit includes a rupturable container mounted between the two elements and carrying a processing liquid for distribution on the photosensitive layer in response to movement of the film unit between a pair of pressure-applying members. The processing liquid, when spread in a uniformly thin layer between the elements, preferably effectuates a silver halide diffusion transfer-reversal process by which a latent image in the photosensitive element is developed and a positive print is produced in the second element. Examples of photographic materials useful in processes of this type are described in detail in my U. S. Patents Nos. 2,543,181, issued on February 27, 1951, and 2,647,056, issued July 28, 1953.

In the foregoing type of film unit the photosensitive element is adapted to be exposed through the image-receptive element and accordingly at least the portion of the second element overlying the area of the photosensitive element to be exposed is formed of a transparent material. A film unit specifically adapted for cameras of the type embodied in the present invention is disclosed in detail in my copending application Serial No. 463,848, filed October 22, 1954 and is provided in a lighttight envelope from which it is adapted to be withdrawn into the camera and positioned for exposure therein.

Rear housing section 24 is secured to forward section 12 and is pivotable with respect to the forward section about an axis through upper wall 16 adjacent guide wall 38. To permit the insertion of a film unit into the camera, a passage 42 is provided in upper wall 28 between sections 12 and 24. Passage 42 communicates with a chamber 44 defined by the walls of rear section 24 and is so formed and located as to receive a film unit and guide it into contact with the rear surface of guide wall 38. A pressure plate 46 is provided in chamber 44 adjacent guide wall 38 and is resiliently biased toward the front of the camera so as to hold a film unit in position for exposure against guide wall 38.

The camera includes means for advancing the film unit into exposure position and for distributing a processing liquid within the film unit during movement of the latter into exposure position. In the form shown, this means comprises a pair of juxtaposed rollers 48 and 50 mounted in passage 42, roller 48 being mounted on forward section 12 and roller 50 being mounted on rear section 24. Rollers 48 and 50 are resiliently urged toward one another so as to engage and compress a film unit inserted into passage 42 between the rollers. A crank 52, pivotally mounted on side wall 22, is provided for so rotating rollers 48 and 50 as to advance a film unit positioned therebetween into exposure position in the camera. In a preferred form of camera 10, spring-operated driving means are provided for rotating pressure rollers 48 and 50 and crank 52 is coupled with the driving spring for tensioning the latter. It is desirable to photoexpose the photosensitive element immediately as the processing liquid is distributed thereon and accordingly the drive means is not only effective to rotate the pressure-applying rollers for moving a film unit into exposure position and spreading the processing liquid, but is also adapted to actuate the shutter of assembly 36 after the film unit has come to rest in exposure position. Manually operable release means are provided for holding the pressure-applying rollers against rotation when the driving spring of the drive means has been tensioned.

In the operation of the camera, the spring of the drive means is tensioned by manually rotating crank 52 and the leading end of a film unit is inserted through passage 42 into the bite of pressure rollers 48 and 50. The release means is then actuated, allowing the pressure rollers to be rotated by the drive means, the processing liquid being spread within the film unit during movement into exposure position. The photosensitive element of the film unit is photoexposed as the film comes to rest in exposure position and the film unit is then permitted to remain in the light-free environment of the camera for a predetermined processing period during which a positive image is produced in the image-receptive element. The rear section 24 of the camera may be opened at the end of this processing period so that the operator may either strip the photosensitive element from the positive photographic image so that the image may be viewed or for removing a processed film unit or print from the camera.

To render camera 10 useful as a viewer, pressure plate 46 is formed of a material such as ground glass or plastic material capable of transmitting diffused light. A viewing ocular or magnifying lens is mounted in rear wall 26 and may be mounted as shown in a barrel 54 adapted to telescope into chamber 44. By virtue of this arrangement, the camera lens and pressure plate 46 may be utilized for viewing the scene to be photographed and for focusing the camera. The viewing lens is preferably provided with a shutter for preventing the admission of light into chamber 44 during exposure and processing of a film unit. The shutter associated with the viewing lens may be so coupled with the shutter of assembly 36 and the drive means of the camera that tensioning of the drive spring by rotation of crank 52 is effective to open both shutters and actuation of the release means is effective to immediately close both shutters so that the film unit is not exposed as it is moved into exposure position. In this manner, the camera may be employed as a view camera for focusing and viewing the scene to be photographed and requires that the operator merely actuate the release means when it is desired to make an exposure.

The herein-disclosed camera is particularly adapted to the production and viewing of color separation prints and particularly to the production of lenticular color prints which are formed and exhibited with the aid of a transparent lenticulated element. To adapt the camera to lenticular color processes, the lens of assembly 36 is provided with means such as filters for separating the taking light into component primary colors. The photosensitive layer of a film unit is exposed through a transparent layer or film having a goffered surface composed of a multiplicity of minute optical elements or lenticules. In the type of film unit described in the last-mentioned application, the image-receiving element is transparent and is provided with a goffered surface. The positive image is formed on the surface of the transparent element behind this goffered surface and comprises a multiplicity of interlaced image components each underlying one of the minute optical elements or lenticules and each composed of a plurality of elements representing the intensities of the primaries present in the taking light formed in the image component. This image may be exhibited in color, for example, by suitably directing illuminating light through a filter similar to that employed in taking and through the transparent goffered element and image.

When a light source is coupled with the taking lens, the camera comprises an ideal viewer for lenticular color prints since the same optical system including the filters is employed for both taking and viewing. This arrangement not only offers the advantages of convenience, since prints can be processed and viewed without being removed from the camera, and less expense, since the cost of a separate viewer is avoided, but also allows the operator to view the results of each exposure immediately as processing is completed and thereby avoid repeating any mistakes when making successive exposures and be assured that prints already produced are acceptable.

Figures 3, 4:
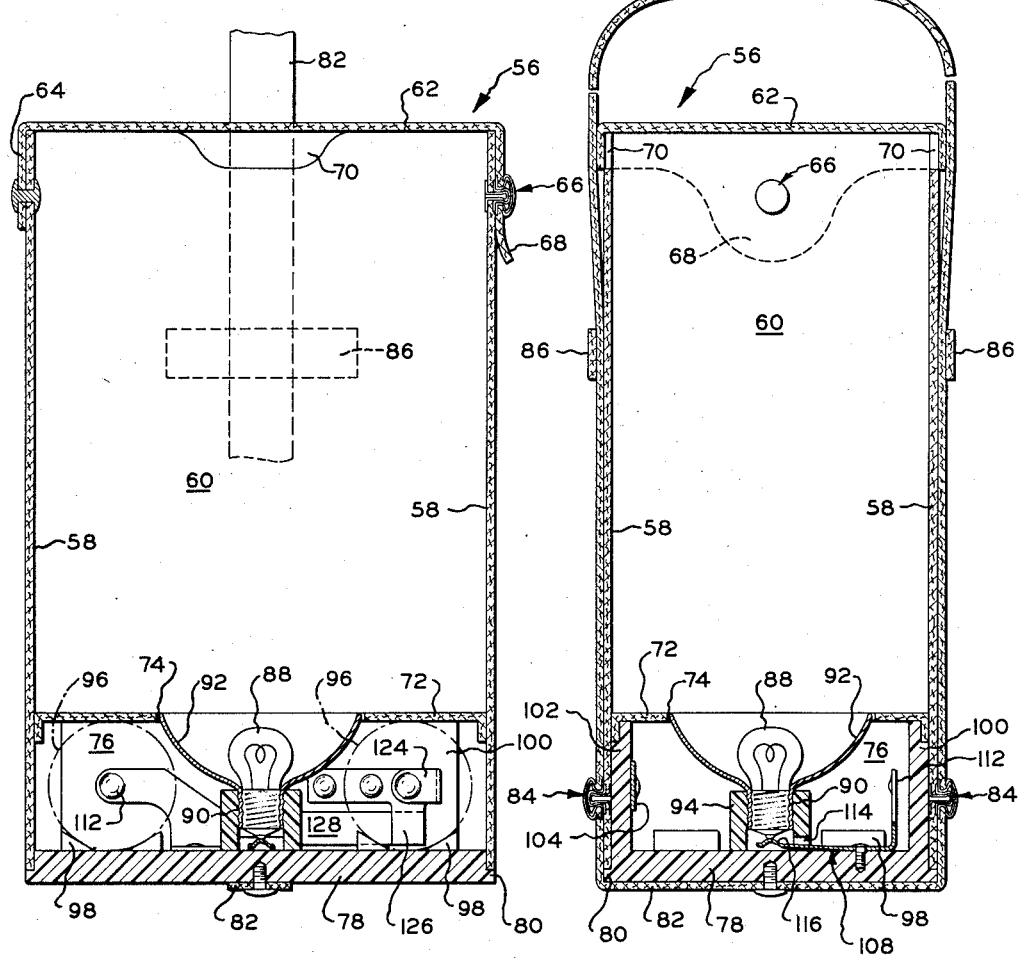
Figs. 3 and 4 are cross-sectional elevation views of one form of carrying case embodying the present invention.

One form of carrying case for camera 10 is illustrated in Figs. 3 through 6 of the drawings and is of the type adapted for protectively storing and carrying the camera and from which the camera is removed for making an exposure. The carrying case includes batteries and a source of illumination and cooperates to allow the camera to be used as a viewer when positioned within the carrying case. The carrying case, designated at 56, comprises four generally rectangular walls 58 of any suitable material such as leather, fabric or plastic material joined together to form a chamber 60 open at opposite ends. A cover 62 having overlapping edges is provided for the upper end of the chamber and is pivotally secured to one side wall by a hinge 64, the opposite side wall including fastening means, indicated at 66, for engaging a flap 68 secured to the side of the cover opposite hinge 64. Side walls 58 are so proportioned that the camera 10 fits completely within chamber 60 with the lens and shutter of assembly 36 extending downwardly and the rear of the camera including lens barrel 54 projecting upwardly, and cover 62 may be closed so that the camera cannot be shifted within the carrying case. Curved notches 70 may be provided in the upper edges of opposite side walls 58 to facilitate grasping the camera for removing it from the carrying case.

As a bottom wall for chamber 60, there is provided a rectangular wall 72 secured at its edges to side walls 58 intermediate their upper and lower ends. Wall 72 is provided with a rounded aperture 74 located in alignment with the lens of camera 10 positioned within chamber 60. Means (not shown) may be provided on wall 72 for supporting the camera in such a manner that any controls for the camera extending from the front thereof are supported clear of the carrying case. Wall 72 cooperates with the lower portions of side walls 58 to define a smaller lower chamber 76 for housing batteries and a source of illumination.

As a means for closing lower chamber 76 and mounting the batteries, light source and electrical elements connecting the batteries with the light source, there is provided a bottom wall 78 formed preferably of an electrically nonconducting material such as a molded plastic. Bottom wall 78 is generally rectangular in shape and is provided with a shoulder 80 around its edges on which the lower edges of walls 58 are seated when wall 78 is positioned in closing relation in the open end of lower chamber 76. A strap 82 is provided for removably holding bottom wall 78 in closing relation to chamber 76 and for carrying the case 56. Strap 82 extends from the lower exterior of wall 78, where it is secured to said wall, upwardly along opposite sides 58 into a loop which may be utilized for carrying the case. The portions of strap 82 disposed adjacent the lower end of case 56 are provided with fastening means such as conventional snap-type fasteners 84 cooperating with fastening means in walls 58 for securing the strap to the walls to thereby releasably retain bottom wall 78 on the carrying case. A pair of loops 86 may be provided as shown on side walls 58 adjacent their upper ends for guiding and supporting strap 82.

The source of illumination for the viewer comprises a conventional incandescent lamp 88 mounted in a socket formed in base 90 of a curved reflector 92. Reflector 92 and lamp 88 are mounted on wall 78 so that the opening of the reflector 92 coincides with aperture 74 in wall 72. As a means for mounting the lamp and reflector on wall 78, there is provided a cylindrical boss or socket 94 preferably formed integrally with wall 78 and adapted to receive the base 90 of reflector 92. Current for lamp 88 may be provided, for example, by a pair of batteries 96 mounted on wall 78 on opposite sides of socket 94. Means, such as two pairs of V-shaped bosses 98, may be provided on wall 78 for retaining batteries 96 against lateral movement, the batteries being retained against bosses 98 by wall 72 and against longitudinal movement by elements of an electrical circuit, to be more fully described.

As a means for mounting elements of the electrical circuit connecting the batteries, for example, in series to lamp 88, there is provided a pair of upstanding support walls 100 and 102 located at opposite sides of wall 78. Walls 100 and 102 are so formed, preferably of an electrically nonconducting material and integrally with wall 78, as to fit within chamber 76 and bear against the underside of wall 72 when bottom wall 78 is in closed position. An elongated conducting element 104 is secured at its mid-section by such means as a pair of rivets 106 to wall 102 so that its ends extend from opposite sides of wall 102 in position to contact the ends of batteries 96 positioned on wall 78. Element 104 is formed of a conducting and preferably resilient material and its ends are biased toward wall 100 so as to make firm contact with the batteries.

A second contact is made at the end of one of the batteries by another conductive element 108 having a generally L-shaped base section 110, at which it is secured to wall 78, and a contact arm 112 extending upward and at an angle from base section 110 into position for contacting the end of one of batteries 96. Socket 94 is provided with a slot 114 adjacent its base and element 108 includes an end section 116 extending through slot 114 into socket 94. Element 108 is formed of an electrically conducting resilient material and end section 116 is biased away from wall 78 so as to form a positive contact with the center terminal on the base of lamp 88. The fourth contact for the batteries is a generally U-shaped element 118 secured to wall 100. Element 118 includes a base portion 120 at which it is secured to wall 100 by such means as rivets 122 and a U-shaped arm 124 adapted to contact the end of a battery 96. Base portion 120 includes a curved arm 126 extending downward toward wall 78 and spaced away from wall 100, curved arm 126 comprising one contact of a switch in the circuit to the lamp for controlling the operation of said lamp.

The switch for controlling the operation of lamp 88 includes an elongated switch element 128 secured at one end to wall 100 with its other end underlying but not touching curved arm 126 of element 118. Switch element 128 is connected by a suitable lead wire 130 to reflector 92 which is in turn electrically connected with lamp 88 through its base secured in base 90 of the reflector. To complete the circuit to the lamp, the free end of element 128 formed of a resilient conducting material is deformed into contact with curved arm 126. A manually operable means is provided for this purpose and comprises a button 132 located in a hole 134 in wall 100 underlying element 128. A retaining ring 136 may be formed integrally with button 132 for retaining the latter within hole 134 in wall 100. A recessed boss 138 is provided on wall 100 surrounding button 132 for protecting the latter against being depressed and the switch closed accidentally. A slot 140 is provided in the bottom edge of wall 58 through which boss 138 projects.

Figure 8:
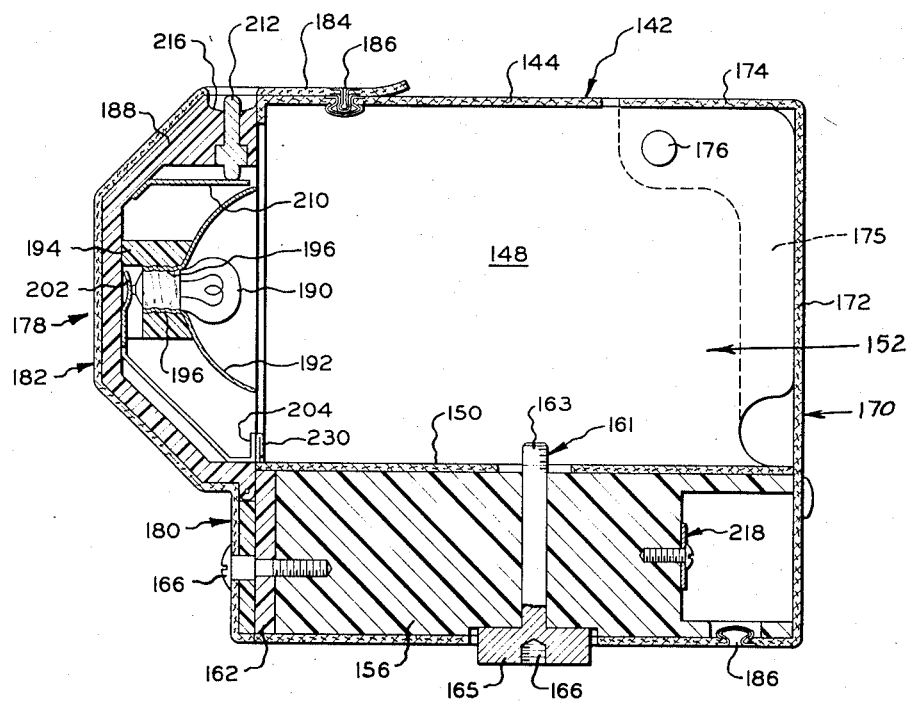
Fig. 8 is an elevation view of the carrying case of Fig. 7 shown in section, taken substantially midway between the sides of the case.
Figure 9:
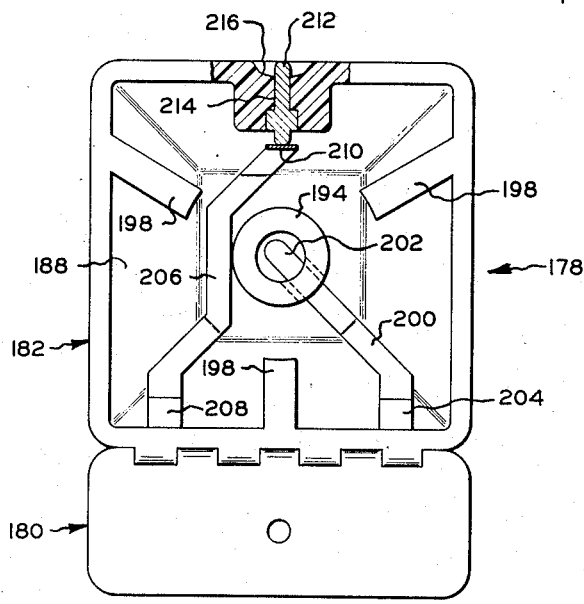
Fig. 9 is an elevation view of one component of the carrying case of Fig. 7.
Figure 10:
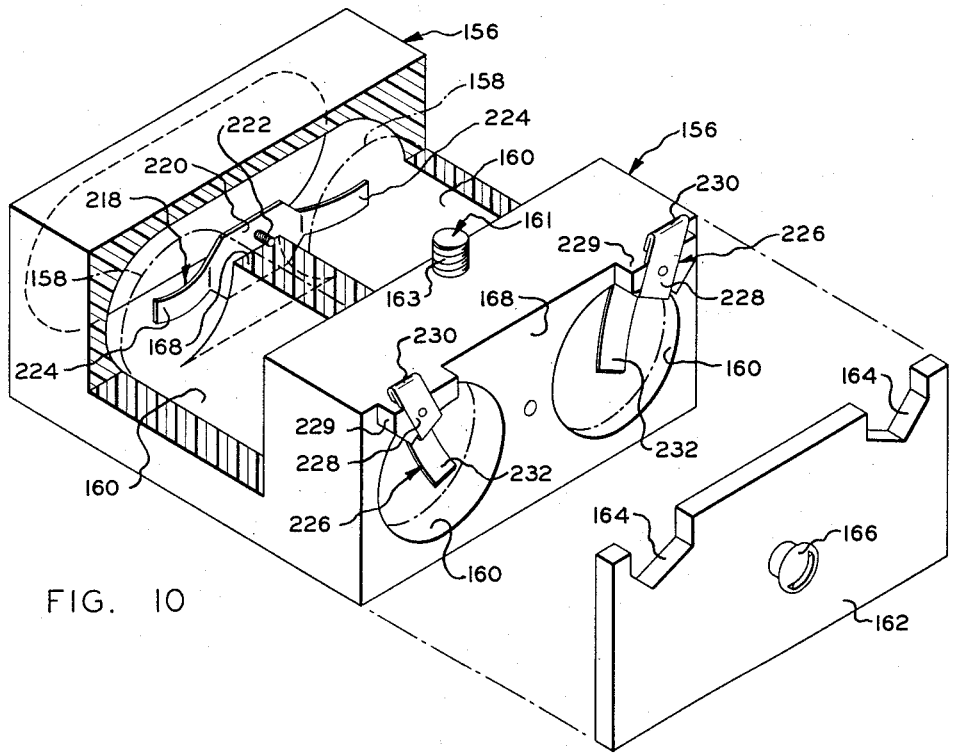
Fig. 10 is a perspective view, partially in section, of components of the carrying case of Fig. 7.
Figure 7:
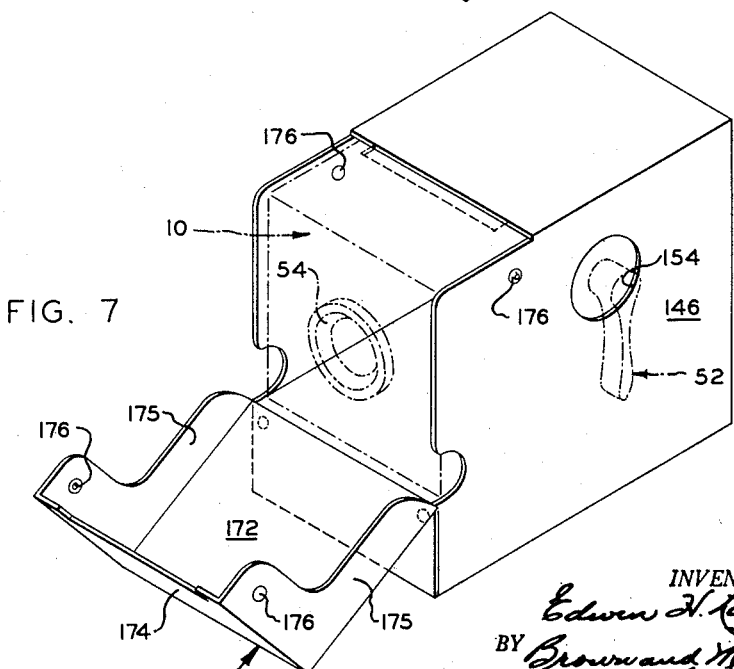
Fig. 7 is a perspective view of another form of carrying case showing a camera mounted within the carrying case.

Reference is now made to Figs. 7 through 10 of the drawings wherein there is illustrated another embodiment of a carrying case comprising the present invention. This case, indicated at 142, is of the type adapted to enclose and support the camera at all times during use of the camera, both for exposure and viewing. The carrying case 142 includes an upper wall 144, two side walls 146 and 148 and an intermediate wall 150 which cooperate to define a chamber 152 open at both ends and enclosing a camera 10 with the lens of assembly 36 located at one open end. Walls 144, 146 and 148 are so formed as to snugly surround the camera on three sides with the camera resting on intermediate wall 150 and are formed of any suitable material, such as leather, fabric or plastic material. Side wall 146 includes a rounded opening 154 through which crank 52 projects and upper wall 144 extends only partially to the rear so as to leave uncovered passage 42 and upper wall 28 of section 24 of camera 10.

Carrying case 142 includes a lower section 156 for mounting a pair of batteries 158 as a source of power for a lamp, lower section 156 being generally parallelepiped shaped and disposed below intermediate wall 150. Section 156 may be in the form of a single element of an electrically nonconducting material and preferably of molded plastic. It includes two cylindrical chambers 160 adapted to contain batteries 158 extending longitudinally of section 156. A closure is provided for the forward end of chambers 160 and comprises a generally rectangularly shaped forward wall 162 so formed as to extend entirely across the forward end of section 156 and having a pair of slots 164 in its upper section to accommodate bosses on the end of lower section 156. To secure forward wall 162 to lower section 156, there is provided a threaded stud or screw 166 extending through wall 162 and secured in a central portion 168 of section 156 between chambers 160. As a means for mounting and securing camera 10 within chamber 152, a stud 161 having a threaded end 163 and adapted to fit into the tripod socket in the lower wall of the camera is provided extending upward through a hole through central portion 168 and intermediate wall 150 into chamber 152. Stud 161 includes a manually engageable head 165 extending beyond the lower surface of section 156 and having a tapped hole 166 for mounting the camera and case in a tripod.

A rear wall 170 is provided for case 142 and is secured to lower section 156 so as to extend upward across the rear of camera 10. Wall 170 includes an upper section 172 adapted to extend across upper wall 28 of rear camera section 24 and passage 42. Rear wall 170 is so formed that it may be folded rearward about a line substantially in the plane of intermediate wall 150 so as to provide access to the viewing lens on rear wall 26 and passage 42 and to allow rear section 24 to be pivoted to an open position. Upper section 172 of rear wall 170 includes a flap 174 extending across a portion of upper wall 144 and side flanges 175 provided with fastening means such as conventional snap-type fasteners 176 for releasably holding rear wall 170 is closed position.

Carrying case 142 includes a forward wall 178 comprising a lower section 180 substantially coextensive with forward wall 162 of lower section 156 and an upper section 182 hingedly secured to lower section 180 and adapted to close the open end of chamber 152. Lower section 180 of forward wall 178 is secured to lower section 156 by stud 166 and is freely pivotable in a plane about a center through the axis of said stud. Upper section 182 includes a flap 184 adapted to extend across a portion of upper wall 144 when section 182 is in a closed position, flap 184 including suitable means such as a snap-type fastener 186 for retaining upper section 182 in closed position. Forward wall 178 is pivotable about stud 166 from a closed position with section 182 disposed uppermost across the open end of chamber 152 to an open position with section 180 uppermost and section 182 extending downward. In this position section 182 may be folded rearwardly against the bottom of lower section 156 where it may be retained by fastener 186 and a suitable reciprocal fastening means located on section 156. When section 182 is conveniently retained in this position against the bottom of section 156, the camera may be used for making exposures, and when section 182 is moved to its closed position, the camera is adapted for use as a viewer.

The upper section 182 of forward wall 178 includes a generally cup-shaped housing 188 formed of a rigid and preferably nonconducting material, such as a molded plastic. Forward wall 178 may be of any suitable material, such as metal, fabric, leather or plastic, and may be formed, for example, of a flexible leather or fabric which extends in covering relation around housing 188 to form both flap 184 and the hinge securing sections 180 and 182 together. Housing 188 is adapted to mount and house a lamp 190, reflector 192, switching means and elements of an electrical circuit. As a means for mounting reflector 192, housing 188 is provided with a cylindrical boss or socket 194 adapted to receive and retain the cylindrical base 196 of reflector 192, the base of lamp 190 being secured in the socket formed by the base 196 of the reflector. Housing 188 may also include several inwardly extending ribs 198 for additionally supporting reflector 192.

The electrical circuit to the lamp includes an elongated conducting element 200 shaped to conform substantially to the inner surface of housing 188 and being secured thereto. Conducting element 200 includes a first end section 202 which extends through a slot in the base of socket 194 into the socket where it makes one contact with the base of lamp 190. The other end of element 200 is located at one side of housing 188 adjacent the lower edge thereof and is turned up to form a contact 204 for a corresponding contact on lower section 156 of carrying case 142. The electrical circuit to lamp 190 is completed through reflector 192 and another elongated conducting element 206 secured to housing 188 and substantially conforming to the shape of the inner wall of the housing. Conducting element 206 extends diagonally upward toward the upper central portion of housing 188 from a location adjacent the lower edge of housing 188 on the opposite side from contact 204 where it (element 206) is turned up to form another contact 208. The upper end section 210 of conducting element 206 forms the movable contact of a switch for controlling the operation of lamp 190, end section 210 extending toward the open side of housing 188 in generally parallel relation to the upper section of housing 188 in a position closely adjacent but not contacting reflector 192. A manually operable push button 212 is provided for deforming end section 210 so that it contacts reflector 192 to complete an electrical circuit to lamp 190. Button 212 extends through a hole 214 in the upper section of housing 188 underlying end section 210 into a recess 216 provided in the outside surface of the upper section of housing 188 surrounding the end of button 212 to prevent the accidental application of pressure on the button.

The other elements of an electrical circuit between the batteries 158 and lamp 190 include an elongated conducting member 218 secured to central portion 168 of lower section 156 across the rear of cylindrical chambers 160. Member 218 comprises an enlarged central section 220 at which it is secured to central portion 168 by such means as a rivet or screw 222 and two curved end sections 224 each extending across and into a chamber 160 so as to contact the ends of batteries 158 positioned in chambers 160 and to electrically connect the batteries in series. Electrical contacts are provided at the forward end of chambers 160 for contacting the other ends of the batteries and include a pair of conductive elements 226. Each conductive element 226 includes a central portion 228 at which it is secured to a boss 229 on the forward end of lower section 156. Central portions 228 extend divergently upward so that they project above the surface of intermediate wall 150 into the forward opening of chamber 152, the end portions of elements 226 forming contacts 230 being adapted to engage contacts 204 and 208 when upper section 182 of forward wall 178 is in closed position. The other end portions 232 of conductive elements 226 extend into and across the forward ends of chambers 160 in contact with the ends of batteries 158 positioned in the chambers. By virtue of this arrangement, batteries 158 are connected in series with lamp 190 when upper section 182 of forward wall 178 is in closed position and button 212 is depressed to hold end section 210 of conducting element 206 in contact with reflector 192. When button 212 is released, the circuit to lamp 190 is open, and when upper section 182 of wall 178 is moved out of closed position, the circuit cannot be closed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus of the character described comprising, in combination, a camera including a housing, a taking lens mounted on one wall of said housing, a viewing lens mounted on a wall of said housing opposite said taking lens, guide means within said housing for predeterminedly positioning a photosensitive element with respect to said taking lens for exposure and means for processing an exposed photosensitive element to produce therefrom a visible photographic image, and a carrying case for said camera, said carrying case being so constructed as to support and enclose said camera and including a first section disposed adjacent the taking lens of said camera, a source of illumination mounted within said first section and so positioned with respect to said taking lens as to illuminate a visible photographic image positioned by said guide means within said camera and thereby convert said camera into a viewer for exhibiting visible photographic images produced thereby, said camera and said first section of said case being movable with respect to one another so as to permit said camera to be employed for exposing photosensitive elements, and a second section disposed adjacent said viewing lens, said second section being movable with respect to said camera to provide access to said viewing lens.

2. The apparatus of claim 1 wherein said source of illumination comprises an electric lamp and said carrying case includes means for supplying an electric current to said lamp and manually operable switch means for controlling the operation of said lamp.

3. A carrying case for a camera of the type including means for exposing and processing a photosensitive element to produce a visible photographic image, said carrying case comprising, in combination, a first section for so supporting and enclosing a camera as to make accessible the exposing and processing means thereof, said carrying case including a second section, an electric lamp and a reflector for directing light from said lamp, said lamp and said reflector being so mounted on said second section that light from said lamp may be directed into said first section so as to enter the objective lens of a camera mounted therein and to convert said camera into a viewer for exhibiting photographic images, a battery for providing electric current for said lamp, means for mounting said battery within said case, and elements of an electrical circuit connecting said battery with said lamp and including a manually operable switch for controlling the operation of said lamp, said second section being movable with respect to said first section so as to permit a camera mounted therein to be employed for making exposures.

4. A carrying case for a camera comprising, in combination, a housing open at opposite ends, first closure means intermediate said ends dividing said housing into first and second chambers, said first chamber being substantially larger than said second chamber and being so constructed as to support and enclose a camera, second closure means for said first chamber being movable to permit the insertion and removal of a camera from said first chamber, third closure means for said second chamber, said third closure means being movable to provide access to said second chamber, an aperture in said first closure means located in alignment with the lens of a camera adapted to be mounted within said first chamber, a source of illumination mounted within said second chamber, and means within said second chamber for directing light from said source through said aperture into said first chamber and the lens of a camera mounted therein so as to enable said camera to be employed for exhibiting photographic images, movement of said third closure means also permitting the photographic exposure of photosensitive film material contained in said camera.

5. A carrying case for a camera comprising, in combination, a housing open at opposite ends, first closure means intermediate said ends dividing said housing into first and second chambers, said first chamber being substantially larger than said second chamber and being so constructed as to support and enclose a camera with the lens thereof disposed adjacent said first closure means, second closure means for said first chamber being movable to permit access to said camera and to permit said camera to be inserted into and removed from said first chamber, an aperture in said first closure means located in alignment with the lens of a camera mounted in said first chamber, a support member, means for securing said support member to said housing in closing relation to said second chamber, a source of illumination including an electric lamp and a reflector mounted within said second chamber on said support member, said reflector being so located adjacent said aperture and so positioned as to direct light from said lamp through said aperture into said first chamber and the lens of a camera mounted therein so as to convert said camera into a viewer for exhibiting photographic images, a battery mounted within said second chamber on said support member for supplying current to said lamp, and means including a manually operable switch mounted on said support member for electrically connecting said battery with said lamp.

6. A camera carrying case comprising, in combination, as first housing means defining a chamber open at one end and being so constructed as to support and enclose a camera with the lens thereof located adjacent said open end, a second housing means comprising support means, means for mounting said second housing means on said first-named housing providing a closure for said chamber, said second housing means being so mounted as to be movable from a closed position to an open position to permit said camera mounted within said chamber to be employed for making a photographic exposure, a source of illumination including an electric lamp so mounted on said support means within said second housing that light from said lamp is directed into said chamber through the lens of said camera mounted therein so as to convert said camera into a viewer for exhibiting photographic images, a third housing means comprising a support means secured at least to said first housing means, said third housing support means serving to mount a battery for supplying power to said lamp, and means including a manually operable switch for electrically connecting said lamp and said battery.

7. A camera carrying case comprising, in combination, upper and lower housing sections, said upper section including walls defining a chamber open at one end and capable of supporting and enclosing a camera with the lens thereof located adjacent said open end, support means, hinge means mounting said support means on said case in an operative position in closing relation to said open end and for movement from operative position so as to permit the employment of a camera mounted within said chamber for making exposures, said hinge means being pivotally mounted on said lower section adjacent said open end and pivotable so as to position said support means adjacent the bottom wall of said lower section, a source of illumination including an electric lamp so mounted on said support means that when said support means is in operative position light from said lamp is directed into said chamber through the lens of a camera mounted therein so as to convert said camera into a viewer for exhibiting photographic images, said lower section including another chmaber, a battery for supplying electric current to said lamp mounted and housed within said other chamber, and means including a manually operable switch for electrically connecting said lamp with said battery when said support member is in operative position.

References Cited in the file of this patent

UNITED STATES PATENTS

| | | |
|---|---|---|
| 1,957,043 | Harlow | May 1, 1934 |
| 1,960,722 | Alderman | May 29, 1934 |
| 2,290,307 | Wicker | July 21, 1942 |
| 2,443,154 | Wolff | June 8, 1948 |